(12) United States Patent
Tsutagawa et al.

(10) Patent No.: US 12,294,209 B2
(45) Date of Patent: May 6, 2025

(54) RESIN MOLDED COMPONENT

(71) Applicants: YAZAKI CORPORATION, Tokyo (JP); TOYOTA JIDOSHA KABUSHIKI KAISHA, Aichi-ken (JP)

(72) Inventors: Yusuke Tsutagawa, Makinohara (JP); Yasuhiro Tanaka, Makinohara (JP); Hiroaki Kodera, Susono (JP); Norihiro Ushida, Numazu (JP); Hiroyuki Hattori, Okazaki (JP)

(73) Assignees: YAZAKI CORPORATION, Tokyo (JP); TOYOTA JIDOSHA KABUSHIKI KAISHA, Aichi-ken (JP)

( * ) Notice: Subject to any disclaimer, the term of this patent is extended or adjusted under 35 U.S.C. 154(b) by 16 days.

(21) Appl. No.: 18/466,741

(22) Filed: Sep. 13, 2023

(65) Prior Publication Data

US 2024/0113510 A1    Apr. 4, 2024

(30) Foreign Application Priority Data

Oct. 4, 2022 (JP) .................................. 2022-159904

(51) Int. Cl.
*H02G 5/00* (2006.01)
*H02G 5/02* (2006.01)

(52) U.S. Cl.
CPC ...................... *H02G 5/02* (2013.01)

(58) Field of Classification Search
CPC ................... H02G 5/00; H02G 5/06
See application file for complete search history.

(56) References Cited

U.S. PATENT DOCUMENTS

| 2005/0227036 | A1 | 10/2005 | Takanashi | |
| 2009/0023345 | A1* | 1/2009 | Matsumoto | H02M 7/003 439/720 |
| 2014/0004727 | A1* | 1/2014 | Jimbo | H01R 13/595 439/110 |
| 2019/0315031 | A1* | 10/2019 | Asahi | H02K 3/50 |
| 2022/0407245 | A1* | 12/2022 | Iizuka | H01R 4/34 |

FOREIGN PATENT DOCUMENTS

JP    2005-297387 A    10/2005

* cited by examiner

*Primary Examiner* — Chau N Nguyen
(74) *Attorney, Agent, or Firm* — KENEALY VAIDYA LLP

(57) ABSTRACT

A resin molded component includes a bus bar having conductivity, a conductive member including an insertion hole into which the bus bar is inserted along an axis line direction, a resin member covering the bus bar and insulating the bus bar and the conductive member, and a potting material charged into the insertion hole. The bus bar includes a bend terminal portion positioned at an end portion in the axis line direction, and bent along a terminal bend direction, and a bus bar crank portion positioned inside the insertion hole and extending along a crank direction intersecting with the axis line direction and the terminal bend direction. The resin member includes a resin crank portion positioned inside the insertion hole and covering and insulating the bus bar crank portion. The potting material covers a whole circumference of the resin crank portion when charged into the insertion hole.

2 Claims, 12 Drawing Sheets

RESIN MOLDED COMPONENT

CROSS-REFERENCE TO RELATED APPLICATION(S)

The present application claims priority to and incorporates by reference the entire contents of Japanese Patent Application No. 2022-159904 filed in Japan on Oct. 4, 2022.

BACKGROUND OF THE INVENTION

1. Field of the Invention

The present invention relates to a resin molded component.

2. Description of the Related Art

For example, Japanese Patent Application Laid-open No. 2005-297387 discloses an insert-molded component including a case to be insert-molded using an inner portion holding a metal member, as an insert. The inner portion includes an engagement portion to be engaged with a mold for molding the case, in a latched state. By this engagement portion, the inner portion is positioned and supported within the mold in a state of being isolated from an inner wall surface of the mold. This engagement portion is positioned on the inner surface side of the case, and the case is formed by covering the periphery of the inner portion with a resin portion except for the engagement portion.

On the other hand, in a resin molded component such as the above-described insert-molded component described in Japanese Patent Application Laid-open No. 2005-297387, waterproof/oilproof performance is sometimes ensured using a so-called potting material after molding, for example. In this case, the resin molded component is desired to satisfy required waterproof/oilproof performance while ensuring mass productivity, for example.

SUMMARY OF THE INVENTION

The present invention has been devised in view of the above-described circumstances, and the object of the present invention is to provide a resin molded component that can properly ensure waterproof/oilproof performance.

In order to achieve the above mentioned object, a resin molded component according to one aspect of the present invention includes a bus bar having conductivity; a conductive member having conductivity and including an insertion hole into which the bus bar is inserted along an axis line direction; a resin member covering the bus bar and insulating the bus bar and the conductive member; and a potting material charged into the insertion hole, wherein the bus bar includes a bend terminal portion positioned at an end portion in the axis line direction and bent along a terminal bend direction intersecting with the axis line direction, and a bus bar crank portion positioned inside the insertion hole and extending along a crank direction intersecting with the axis line direction and the terminal bend direction, the resin member includes a resin crank portion positioned inside the insertion hole and covering and insulating the bus bar crank portion, and the potting material covers a whole circumference of the resin crank portion in a state of being charged into the insertion hole.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

An embodiment according to the present invention will be described in detail below based on the drawings. In addition, the present invention is not limited by the embodiment. Further, components in the following embodiment include the ones that can be replaced by those skilled in the art, and are easy, or the ones that are substantially identical.

Figure 1:
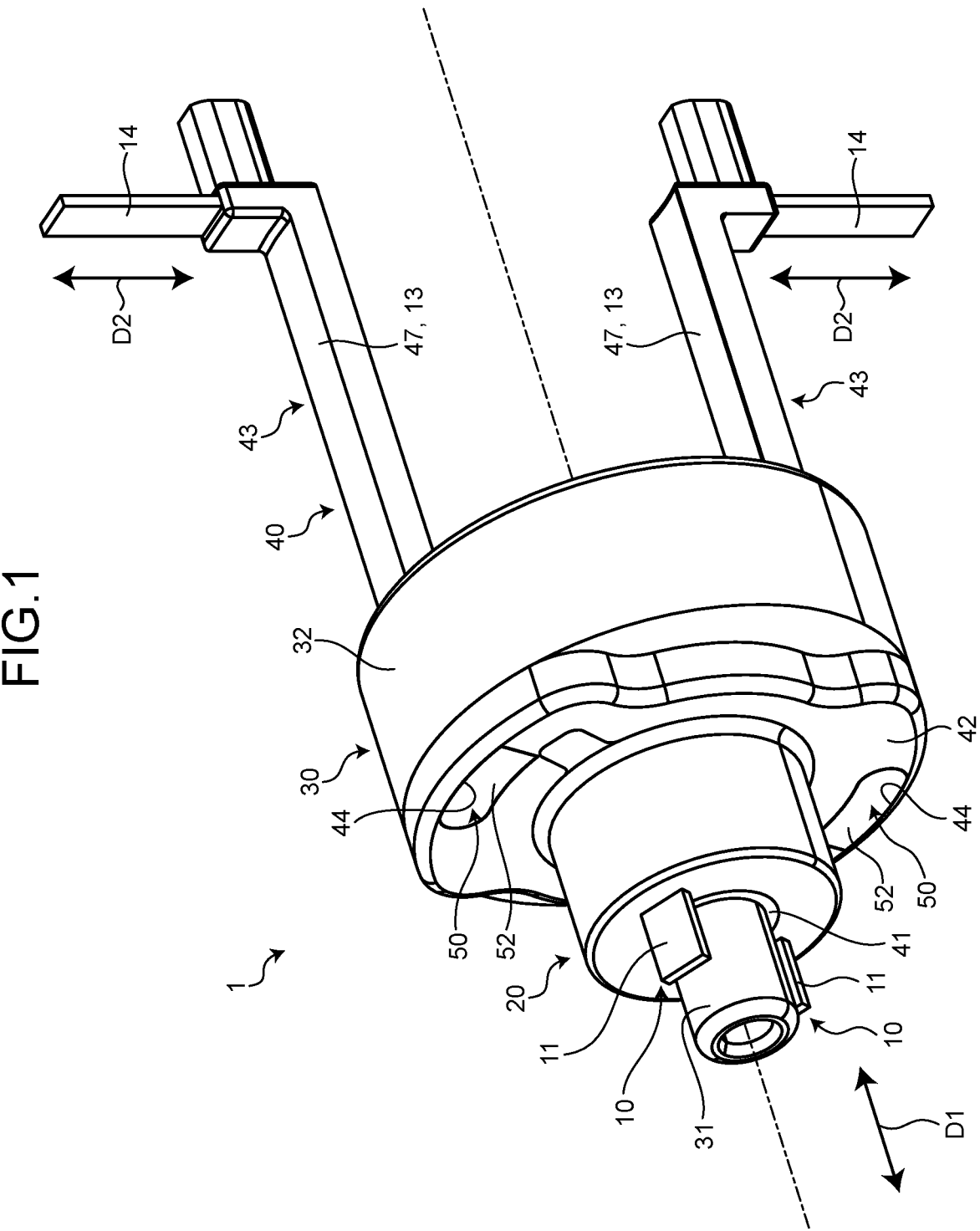
FIG. 1 is a schematic perspective view illustrating a schematic configuration of a resin molded component according to an embodiment.
Figure 2:
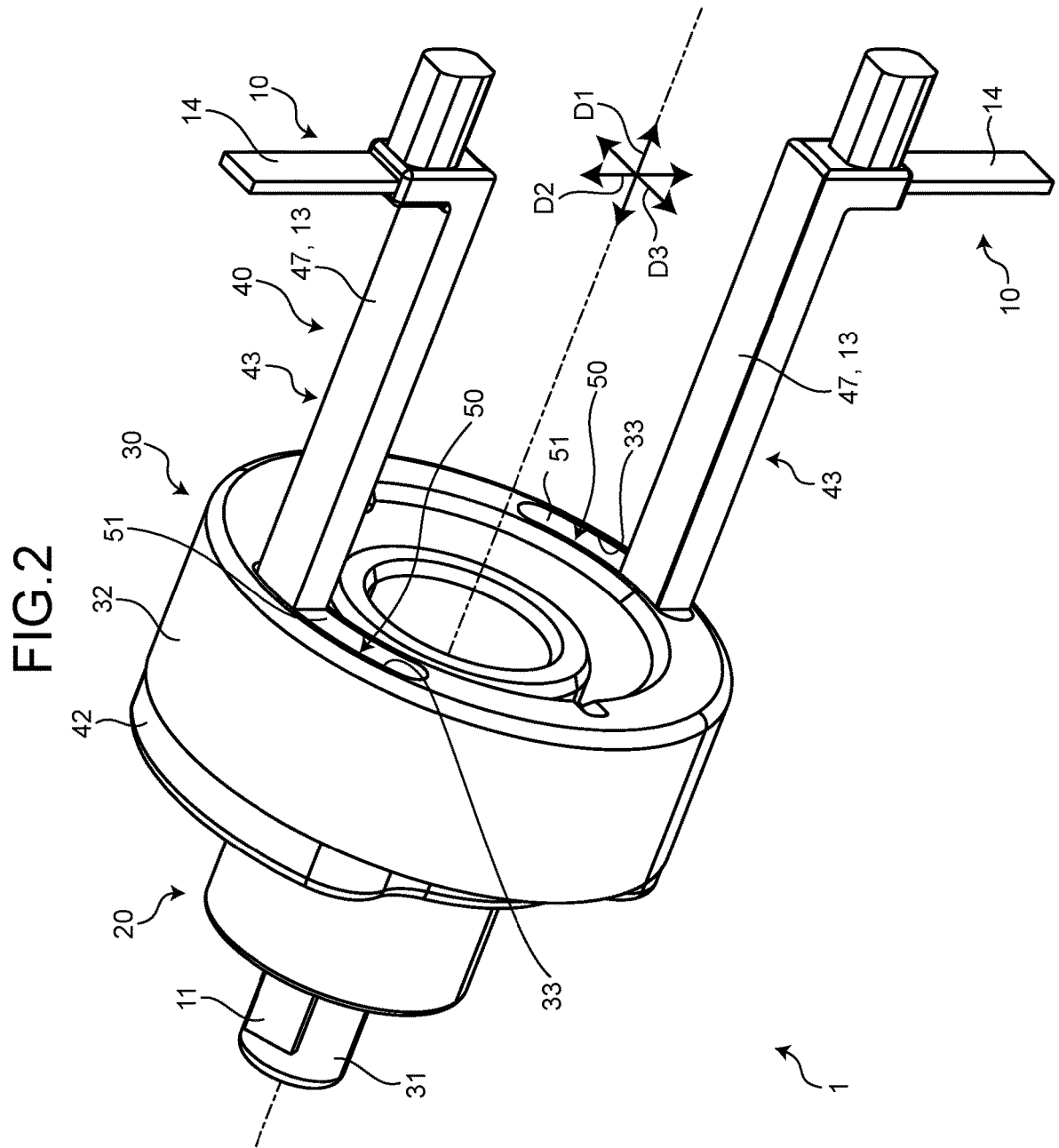
FIG. 2 is a schematic perspective view illustrating a schematic configuration of a resin molded component according to an embodiment.
Figure 3:
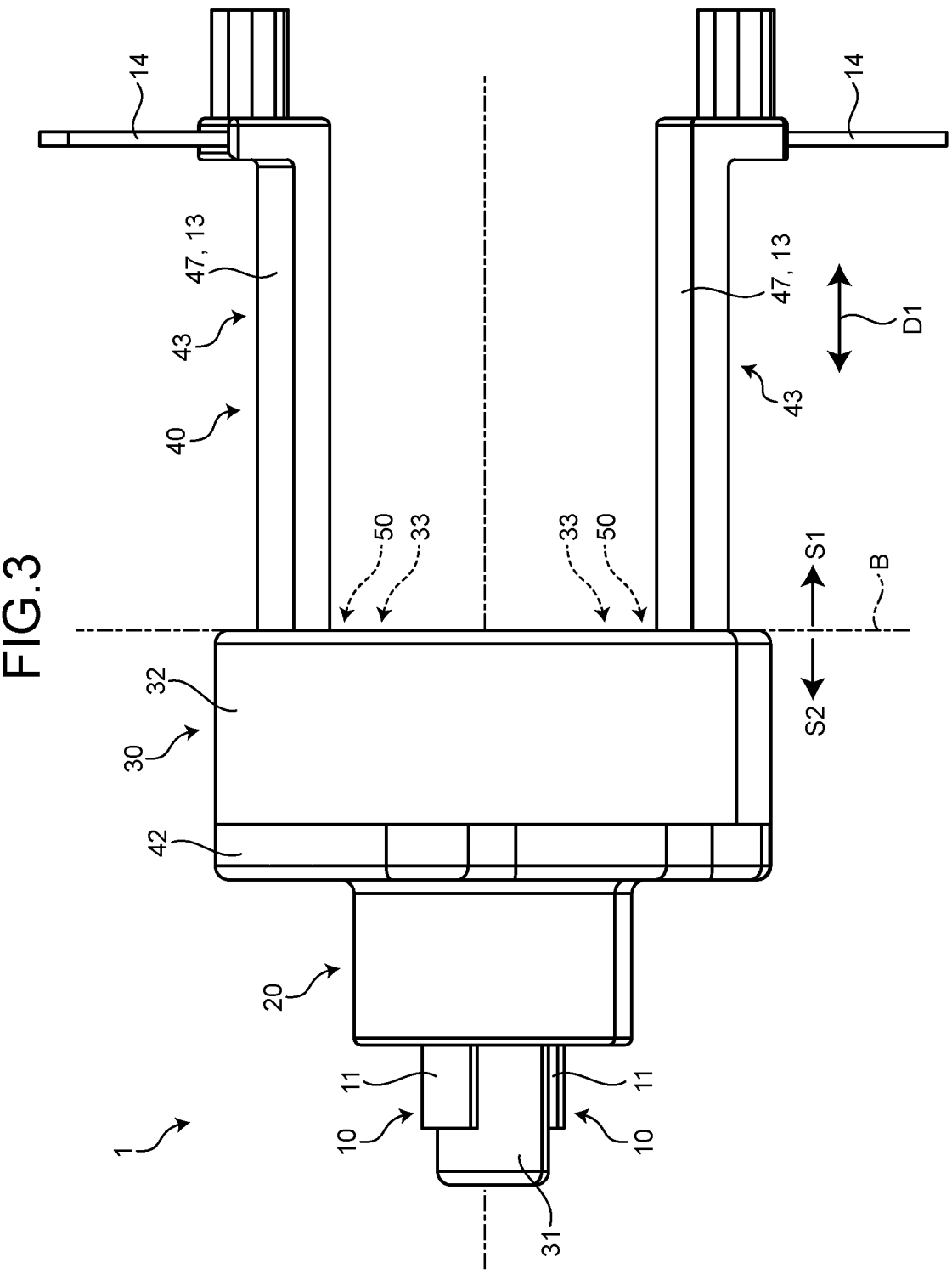
FIG. 3 is a schematic side view illustrating a schematic configuration of a resin molded component according to an embodiment.
Figure 4:
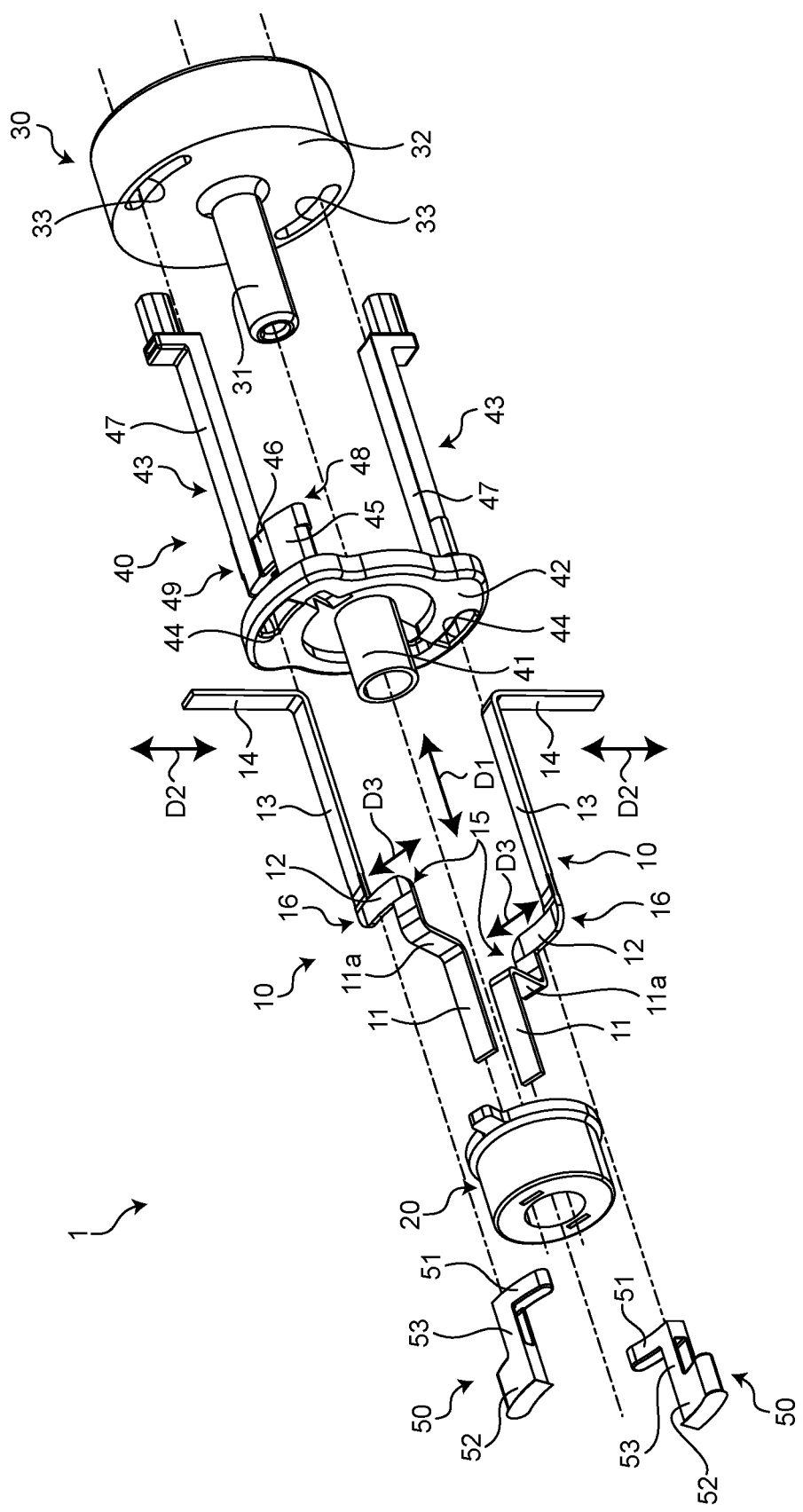
FIG. 4 is a schematic exploded perspective view illustrating a schematic configuration of a resin molded component according to an embodiment.
Figure 5:
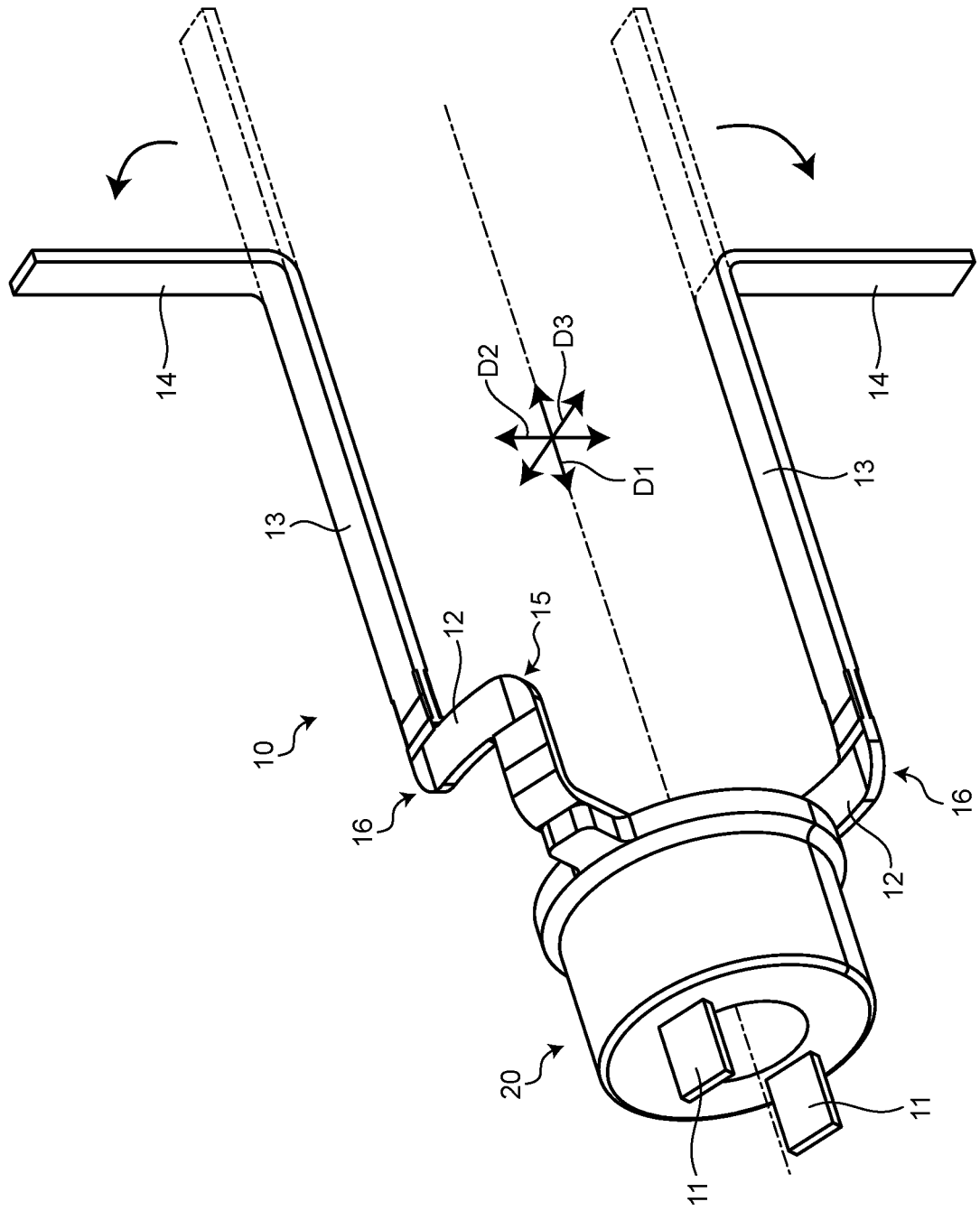
FIG. 5 is a schematic perspective view illustrating a bus bar and a first resin member that are included in a resin molded component according to an embodiment.
Figure 6:
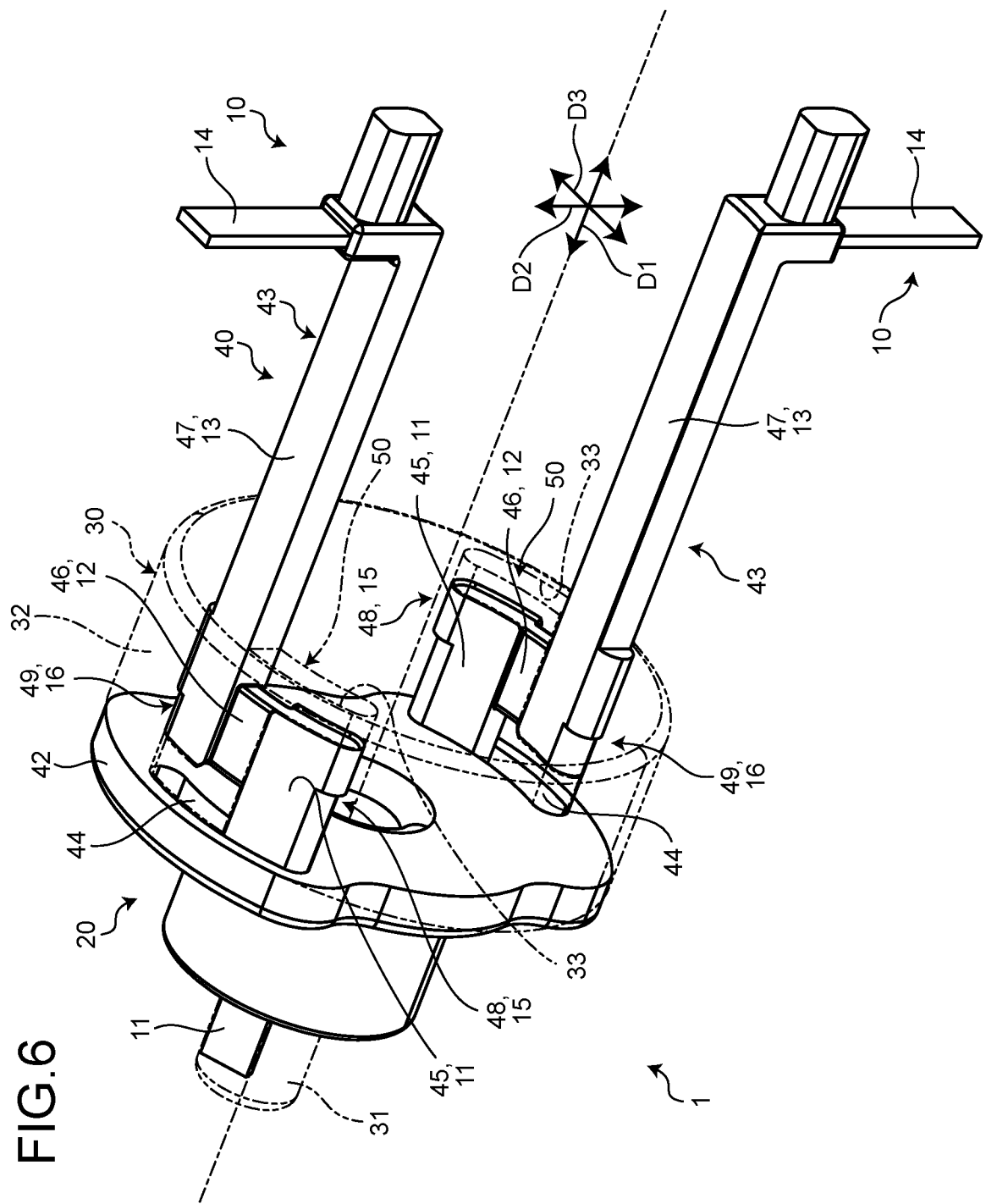
FIG. 6 is a schematic perspective view illustrating a bus bar, a first resin member, and a second resin member that are included in a resin molded component according to an embodiment.
Figure 7:
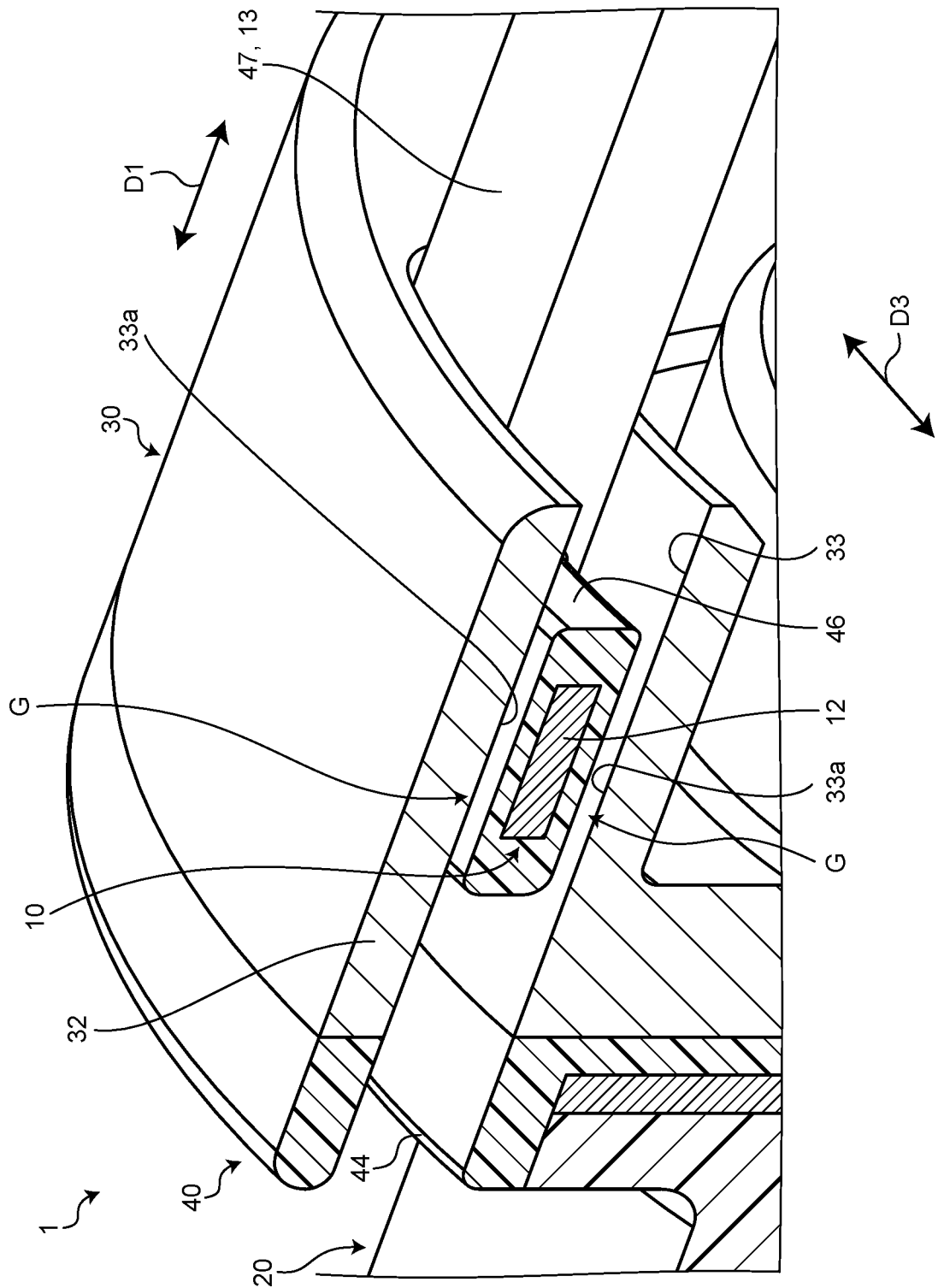
FIG. 7 is a schematic partial cross-sectional perspective view illustrating a bus bar, a conductive member, and a second resin member that are included in a resin molded component according to an embodiment.
Figure 8:
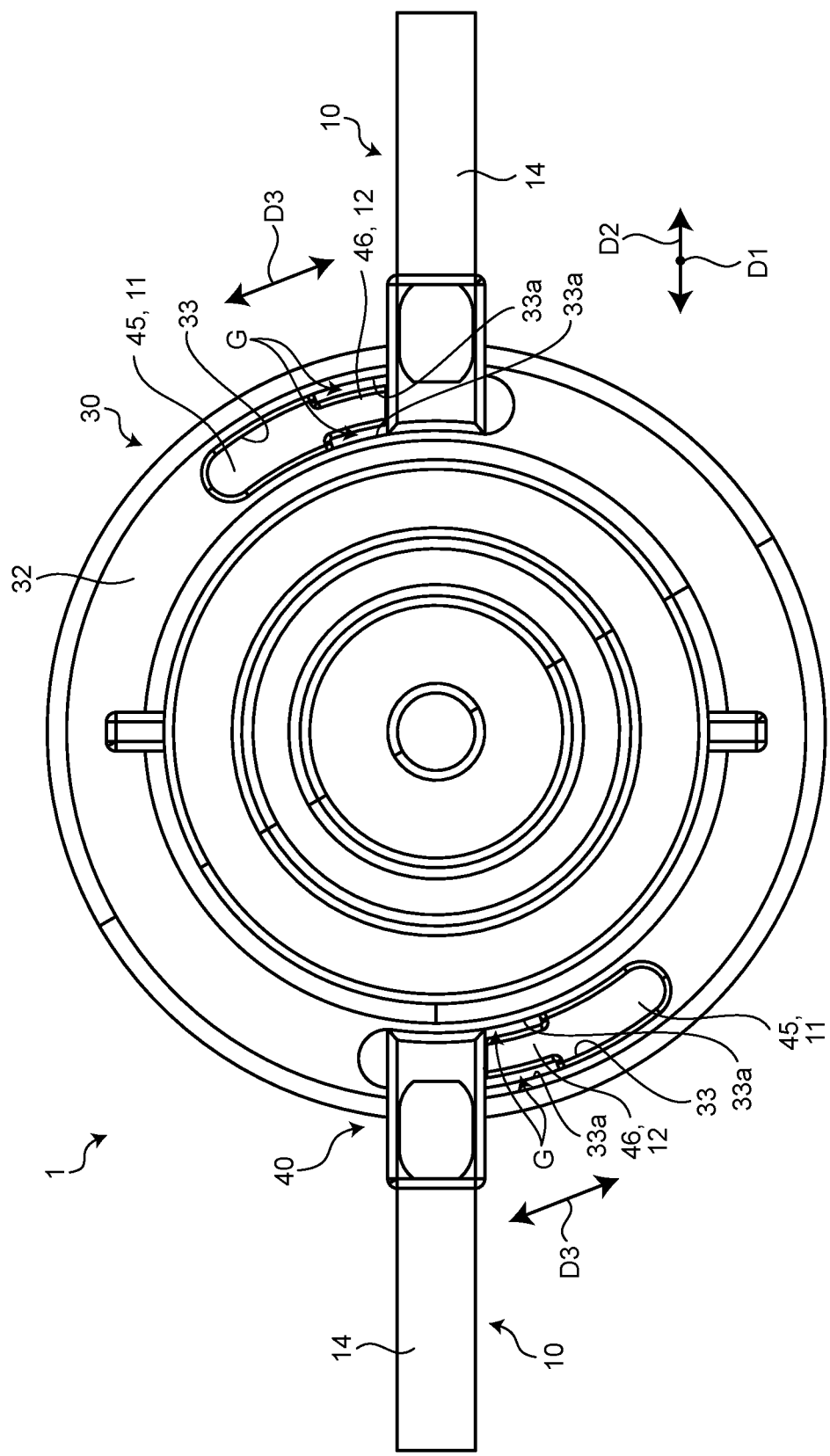
FIG. 8 is a schematic plan view illustrating a bus bar, a conductive member, and a second resin member that are included in a resin molded component according to an embodiment.
Figure 9:
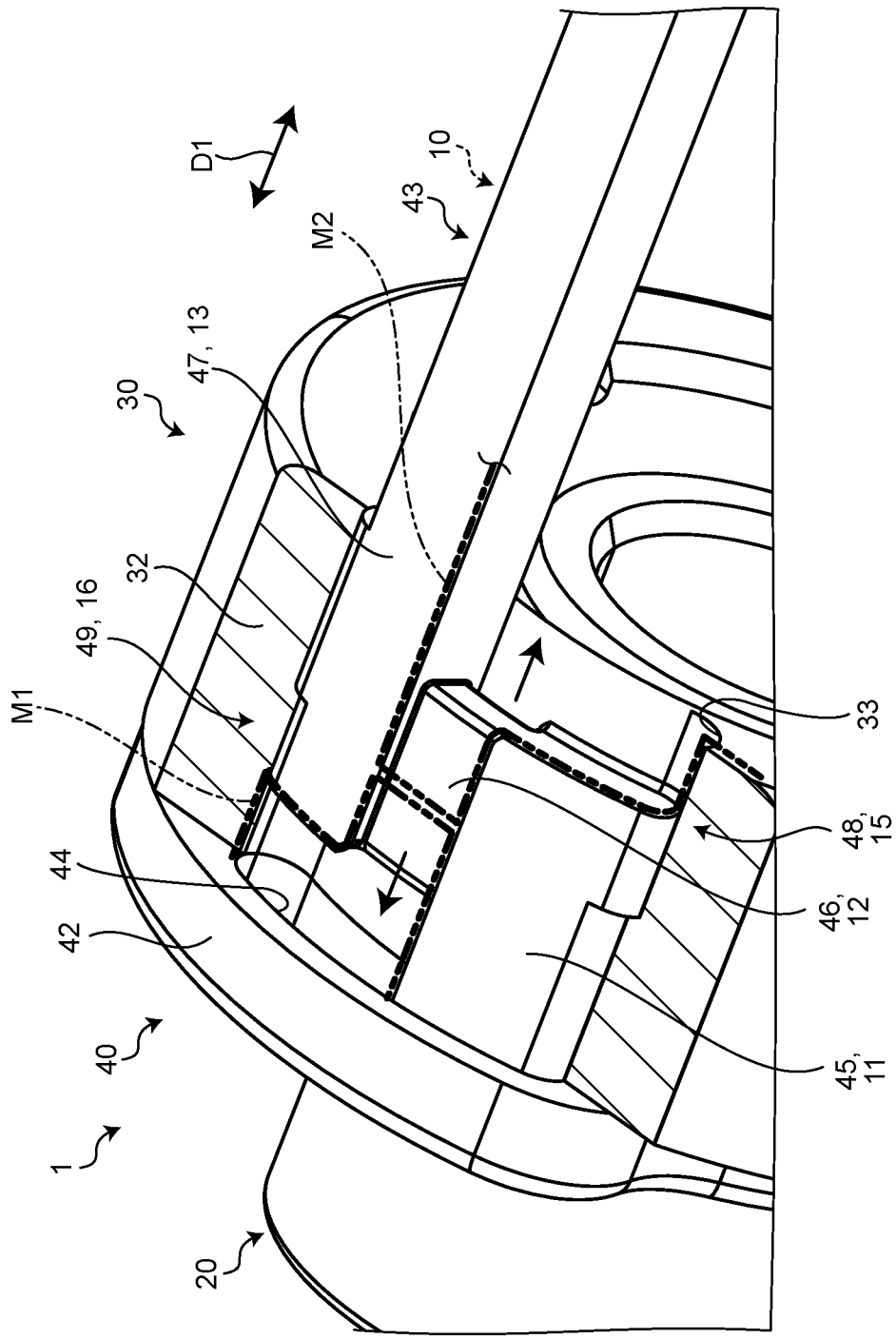
FIG. 9 is a schematic partial cross-sectional perspective view illustrating a bus bar, a first resin member, a conductive member, and a second resin member that are included in a resin molded component according to an embodiment.
Figure 10:
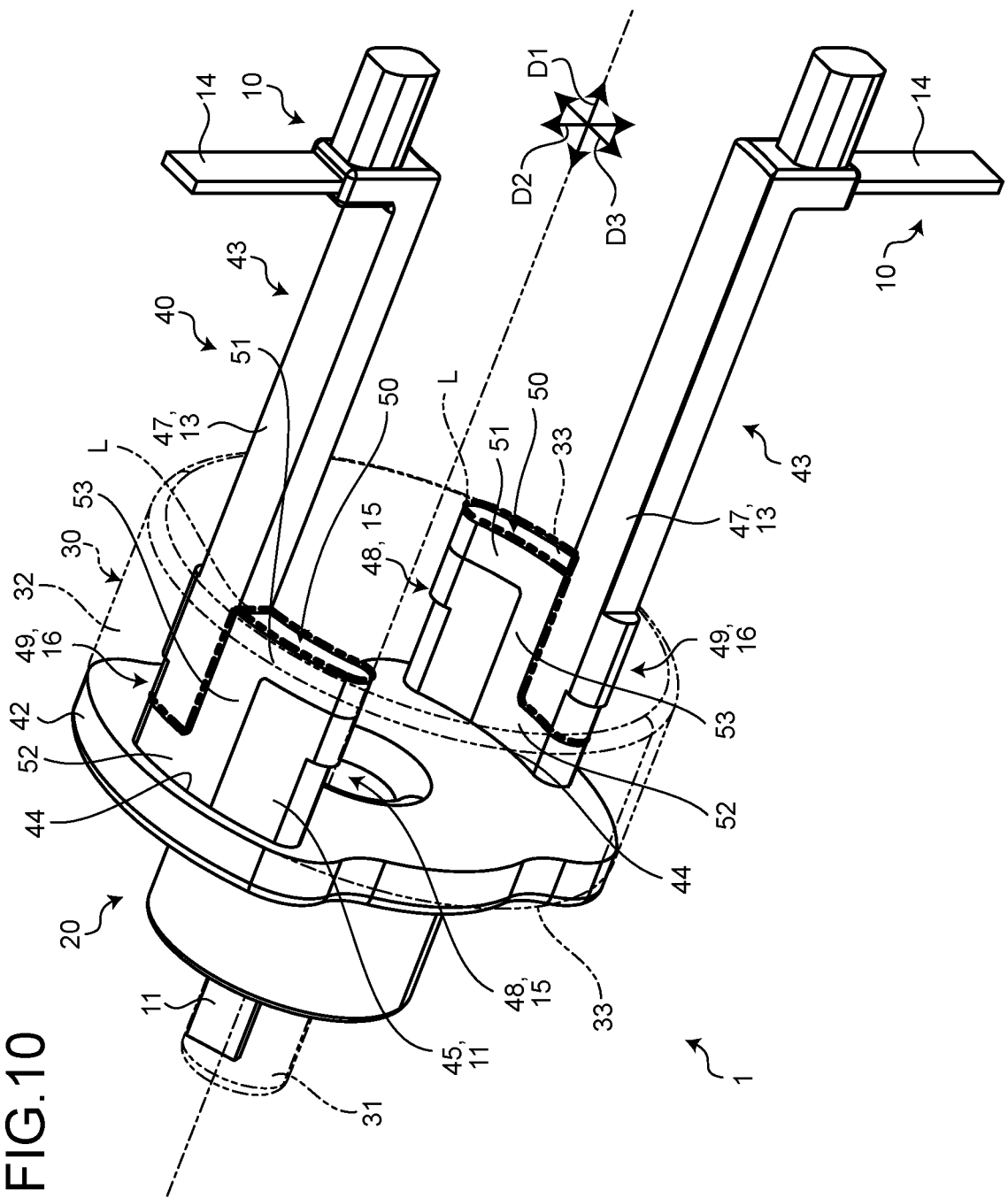
FIG. 10 is a schematic perspective view illustrating a bus bar, a first resin member, a second resin member, and a potting material that are included in a resin molded component according to an embodiment.
Figure 11:
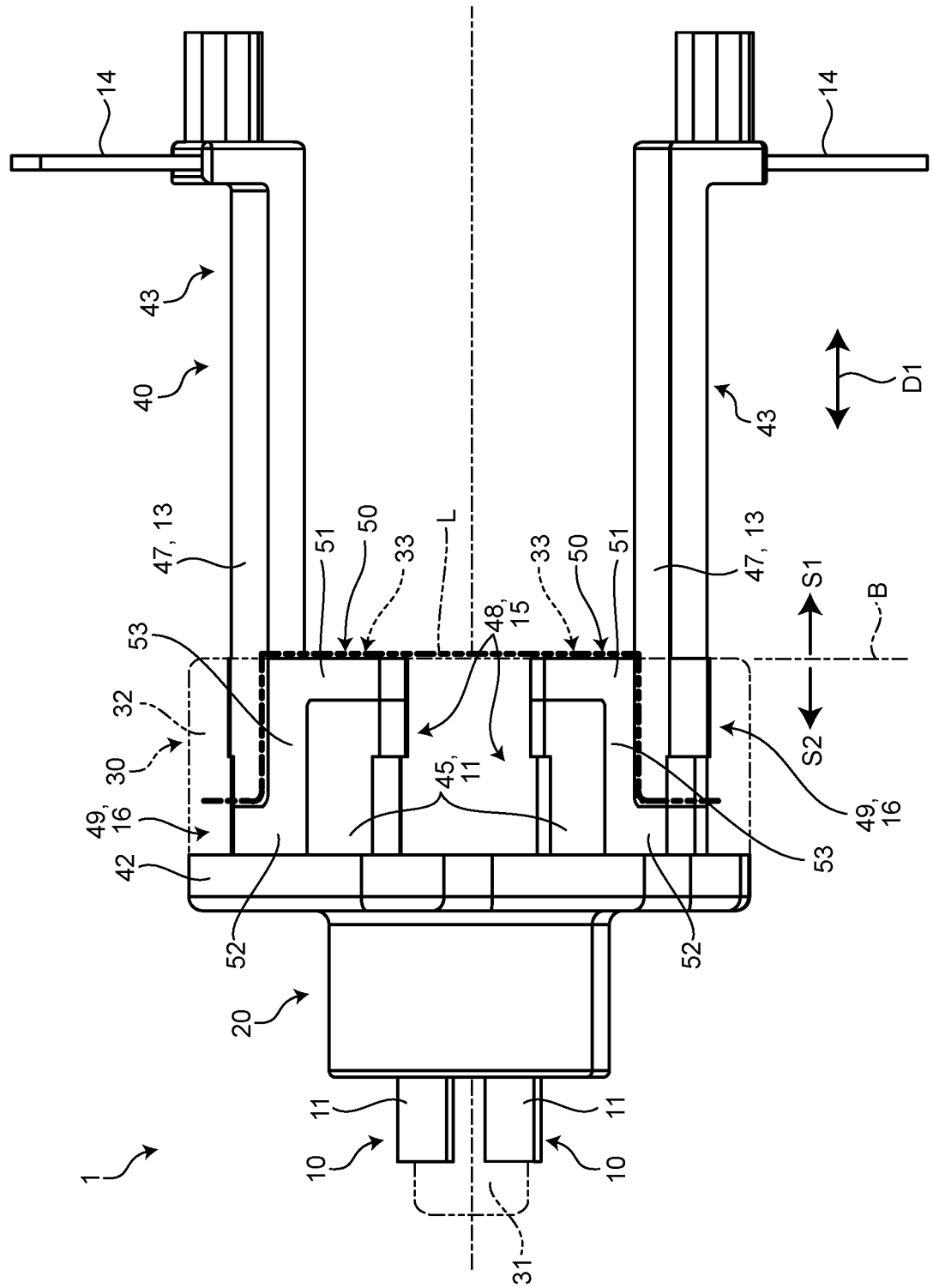
FIG. 11 is a schematic side view illustrating a bus bar, a first resin member, a second resin member, and a potting material that are included in a resin molded component according to an embodiment.

In addition, the drawings to be described below schematically illustrate a simplified shape of a resin molded component. For example, FIG. 6 schematically illustrates a conductive member and a potting material using dashed-two dotted lines. In FIGS. 7, 8, and 9, the illustration of the potting material is omitted, and FIG. 9 is a diagram illustrating a part of the conductive member in an exploded state to illustrate the inside of an insertion hole of the conductive member in an easy-to-understand manner. FIGS. 10 and 11 schematically illustrate the conductive member using a dashed-two dotted line.

Embodiment

As illustrated in FIGS. 1, 2, 3, and 4, a resin molded component 1 according to the present embodiment includes a bus bar 10, a first resin member 20, a conductive member 30, a second resin member 40, and a potting material 50. The bus bar 10 is a conductor having conductivity. The first resin member 20 and the second resin member 40 are insulators that cover and insulate the bus bar 10. In other words, the bus bar 10, the first resin member 20, and the second resin member 40 constitute an insulated bus bar in which the bus bar 10 is covered and insulated by the first resin member 20 and the second resin member 40. The conductive member 30 is a rigid member (rigid body) having conductivity, and including an insertion hole 33 into which the bus bar 10 is inserted along an axis line direction D1. The potting material 50 is a sealer charged into the insertion hole 33.

The resin molded component 1 according to the present embodiment is an insert-molded component in which the bus bar 10 and the conductive member 30 are insulated by the first resin member 20 and the second resin member 40, by integrally molding the bus bar 10, the first resin member 20, the conductive member 30, and the second resin member 40 by insert molding.

Then, the resin molded component 1 according to the present embodiment conducts electricity, via the bus bar 10, between a connection target existing on one side, and a connection target existing on the other side across a boundary B (refer to FIG. 3) corresponding to an end surface on one side in the axis line direction D1 of the conductive member 30. Then, the resin molded component 1 is applied under an environment under which a space on one side of the boundary B becomes a liquid/oil space S1 (refer to FIG. 3), and a space on the other side becomes an aerial space S2 (refer to FIG. 3). Under such an environment, waterproof/oilproof performance of the resin molded component 1 is ensured by sealing the insertion hole 33 of the conductive member 30 with the potting material 50.

For example, in the resin molded component 1, after the first resin member 20 is primarily molded by insert molding with respect to the bus bar 10, the second resin member 40 is secondarily molded by insert molding by assembling the conductive member 30. Then, after the second resin member 40 is molded, by charging the potting material 50 into the insertion hole 33 of the conductive member 30, and waterproofing and oilproofing a space between the second resin member 40 and the conductive member 30 using the potting material 50, waterproof/oilproof performance of the resin molded component 1 is ensured.

Then, in the resin molded component 1 of the present embodiment that has such a configuration, a predetermined crank shape is formed in the bus bar 10, and the second resin member 40 covering this. With this shape, the resin molded component 1 of the present embodiment realizes a structure of satisfying proper waterproof/oilproof performance, while ensuring moldability of a mold in insert molding and improving mass productivity. Hereinafter, each configuration of the resin molded component 1 will be described in detail with reference to the drawings.

Specifically, as illustrated in FIGS. 1, 2, 3, and 4, the bus bar 10 is a conductor extending along the axis line direction D1. The bus bar 10 forms an electrically-conducting path that electrically connects and conducts electricity between a connection target on one side in the axis line direction D1, and a connection target on the other side. The bus bar 10 bends at a plurality of portions, and in this example, a crank shape is formed at a midpoint in the axis line direction D1. In this example, a pair of bus bars 10 having an approximately the same shape are provided. The pair of bus bars 10 are arranged in such a manner that one is arranged at a position rotated by about 180 degrees around the axis line direction D1 with respect to the other, and are arranged in such a manner as to symmetrically face with respect to a direction intersecting with the axis line direction D1.

More specifically, the bus bar 10 includes a first axis line direction extending portion 11, a bus bar crank portion 12, a second axis line direction extending portion 13, and a bend terminal portion 14. In the bus bar 10, the first axis line direction extending portion 11, the bus bar crank portion 12, the second axis line direction extending portion 13, and the bend terminal portion 14 are integrally formed of a metal material having conductivity. In addition, the above-described portions of the bus bar 10 may be formed by connecting by welding or the like a plurality of member formed in a divided manner. In the bus bar 10, the first axis line direction extending portion 11, the bus bar crank portion 12, the second axis line direction extending portion 13, and the bend terminal portion 14 are positioned side by side in this order in the axis line direction D1 from the aerial space S2 side toward the liquid/oil space S1 side.

Both of the first axis line direction extending portion 11 and the second axis line direction extending portion 13 are portions in the bus bar 10 that extend along the axis line direction D1. An end portion of the first axis line direction extending portion 11 on one side in the axis line direction D1 is coupled to the bus bar crank portion 12, and a connection target is connected to the other side. In this example, in the first axis line direction extending portion 11, a stepped portion 11a is formed at a midpoint in the axis line direction D1. The stepped portion 11a is a portion at which a step is formed along a direction intersecting with the axis line direction D1, and has a stepped shape oriented toward sides separated from each other in the pair of bus bars 10. The second axis line direction extending portion 13 is interposed between the bus bar crank portion 12 and the bend terminal portion 14 with respect to the axis line direction D1. Then, an end portion of the second axis line direction extending portion 13 on one side in the axis line direction D1 is coupled to the bend terminal portion 14, and an end portion on the other side is coupled to the bus bar crank portion 12.

The bus bar crank portion 12 is a portion in the bus bar 10 that extends along a crank direction D3. The crank direction D3 is a direction intersecting with the axis line direction D1 and a terminal bend direction D2 of the bend terminal portion 14, which will be described later, and typically is a direction extending around the axis line direction D1 or a tangential direction of the around direction. The bus bar crank portion 12 is interposed between the first axis line direction extending portion 11 and the second axis line direction extending portion 13 with respect to the crank direction D3. Then, an end portion of the bus bar crank portion 12 on one side in the crank direction D3 is coupled to an end portion of the first axis line direction extending portion 11 on one side in the axis line direction D1, and an end portion on the other side is coupled to an end portion of the second axis line direction extending portion 13 on the other side in the axis line direction D1. In other words, the bus bar crank portion 12 couples, along the crank direction D3, the end portion of the first axis line direction extending portion 11 on one side in the axis line direction D1, and the end portion of the second axis line direction extending portion 13 on the other side in the axis line direction D1.

In the bus bar 10, a portion at which the end portion of the first axis line direction extending portion 11 and the bus bar crank portion 12 intersect approximately orthogonally forms a bus bar bend end portion 15, and a portion at which the end portion of the second axis line direction extending portion 13 and the bus bar crank portion 12 intersect approximately orthogonally forms a bus bar bend end portion 16. The bus bar 10 includes the bus bar bend end portion 15 and the bus bar bend end portion 16. By the two bus bar bend end portions corresponding to the bus bar bend end portion 15 and the bus bar bend end portion 16, and the bus bar crank portion 12, the bus bar 10 is formed into a crank shape of bending approximately orthogonally at two points. Then, the bus bar crank portion 12, and the two bus bar bend end portions corresponding to the bus bar bend end portion 15 and the bus bar bend end portion 16 form a portion in the bus bar 10 that is positioned inside the insertion hole 33 of the conductive member 30.

The bend terminal portion 14 is a portion that is positioned in the bus bar 10 at an end portion on one side in the axis line direction D1, and bends along the terminal bend direction D2 intersecting with the axis line direction D1. The terminal bend direction D2 is a direction intersecting with the axis line direction D1 and the above-described crank direction D3 of the bus bar crank portion 12, and is typically a radial direction orthogonal to the axis line direction D1. The bend terminal portion 14 is formed in such a manner that the end portion of the second axis line direction extending portion 13 on one side in the axis line direction D1 bends approximately orthogonally along the terminal bend direction D2, and a connection target is connected to a leading end side. In other words, an end portion of the bend terminal portion 14 on one side in the terminal bend direction D2 is coupled to the end portion of the second axis line direction extending portion 13 on one side in the axis line direction D1, and a connection target is connected to the other side. In this example, the bend terminal portion 14 is formed with bending approximately orthogonally toward the sides separated from each other along the terminal bend direction D2 in the pair of bus bars 10.

As illustrated in FIGS. 1, 2, 3, 4, and 5, the first resin member 20 is an insulator that covers a part of the pair of bus bars 10, and insulates the part of the bus bars 10 and the conductive member 30. The first resin member 20 is formed of a resin material having insulation. In this example, the first resin member 20 is a primary molded body molded in such a manner as to cover the vicinity of the stepped portion 11a of the first axis line direction extending portion 11 included in the bus bar 10. The first resin member 20 of the present embodiment is formed into an approximately cylindrical shape having a central axis line extending along the axis line direction D1, and an end portion positioned on the opposite side of the bus bar crank portion 12 side in the bus bar 10 across the stepped portion 11a is buried inside, and the first resin member 20 covers and insulates the portion. For example, the first resin member 20 is formed by setting (inserting) the pair of bus bars 10 into a mold for insert molding, in the above-described positional relationship, charging a resin material into the mold, solidifying the resin material, and then demolding. The first resin member 20 molded in this manner functions as an insulator covering the bus bar 10, and also functions as a positioning holding member that holds the pair of bus bars 10 in a positional relationship of facing symmetrically with respect to the direction intersecting with the axis line direction D1, as described above. The end portions of both of the pair of bus bars 10 that are positioned on the opposite side of the bus bar crank portion 12 side across the stepped portion 11a of the first axis line direction extending portion 11 are covered by the first resin member 20. Then, in the pair of bus bars 10, the other part of the first axis line direction extending portion 11, the bus bar crank portion 12, the second axis line direction extending portion 13, and the bend terminal portion 14 are exposed from the first resin member 20.

As illustrated in FIGS. 1, 2, 3, and 4, the conductive member 30 is a rigid member (rigid body) forming a shaft portion extending along the axis line direction D1, and includes the insertion hole 33 into which the bus bar 10 is inserted. The conductive member 30 has conductivity, and is formed of a metal material having relatively-high rigidity, and also functions as a fixing portion for fixing the resin molded component 1 and another member, for example. Further, the conductive member 30 is insulated from the bus bar 10 via the first resin member 20 and the second resin member 40, and sometimes functions as a ground (earth) member, for example.

More specifically, the conductive member 30 includes a shaft portion 31 and a base portion 32. In the conductive member 30, the shaft portion 31 and the base portion 32 are integrally formed of a metal material having conductivity. In addition, the above-described portions of the conductive member 30 may be formed by connecting by welding or the like a plurality of member formed in a divided manner. In the conductive member 30, the shaft portion 31 and the base portion 32 are positioned side by side in this order in the axis line direction D1 from the aerial space S2 side toward the liquid/oil space S1 side.

The shaft portion 31 and the base portion 32 both have central axis lines extending along the axis line direction D1, and are formed into an approximately cylindrical shape coaxial with the first resin member 20. The shaft portion 31 is a portion formed to have a relatively small diameter in the conductive member 30, and the base portion 32 is a portion formed to have a relatively large diameter in the conductive member 30.

The shaft portion 31 is positioned in the first resin member 20 with being sandwiched between the first axis line direction extending portions 11 of the pair of bus bars 10, and penetrates through the first resin member 20 along the axis line direction D1. An end portion of the shaft portion 31 on one side in the axis line direction D1 is coupled to the base portion 32, and the other end portion is exposed from the first resin member 20.

The entire base portion 32 is exposed from the first resin member 20. The base portion 32 supports the end portion of the shaft portion 31 one side in the axis line direction D1, and forms a fixing portion for fixing the resin molded component 1 and another member. For example, the base portion 32 may be rotatably supported by a bearing or the like. Then, in the base portion 32, the insertion hole 33 through which the bus bar 10 penetrates along the axis line direction D1 is formed.

The insertion hole 33 penetrates through the base portion 32 along the axis line direction D1. The insertion hole 33 is formed at an outer rim end portion of the base portion 32 into an approximately arc slit shape. A pair of insertion holes 33 are provided in such a manner as to correspond to the pair of bus bars 10. The pair of insertion holes 33 are arranged in such a manner that one is arranged at a position rotated by about 180 degrees around the axis line direction D1 with respect to the other, and are arranged in such a manner as to symmetrically face with respect to a direction intersecting with the axis line direction D1. In a state in which the bus bar 10 is inserted along the axis line direction D1, as described above, the bus bar crank portion 12 and the bus bar bend end portions 15 and 16 of the bus bar 10 are positioned inside the insertion hole 33.

After the first resin member 20 is primarily molded with respect to the bus bar 10, the conductive member 30 having the above-described configuration is assembled to the bus bars 10 in such a manner that the bus bars 10 are inserted into the respective insertion holes 33 along the axis line direction D1. In addition, in this case, as indicated by dashed-two dotted lines in FIG. 5, when the bus bar 10 is insert-molded together with the first resin member 20, a portion forming the bend terminal portion 14 is not bent yet, and is in a state of linearly extending along the axis line direction D1. Then, in the bus bar 10, after the first resin member 20 is primarily molded, the conductive member 30 is assembled in such a manner that the leading end side of the second axis line direction extending portion 13 is inserted into the insertion hole 33 along the axis line direction D1. After that, in the bus bar 10, before the second resin member 40 is secondarily molded, the leading end side of the second axis line direction extending portion 13 is bent along the terminal bend direction D2, and the bend terminal portion 14 is formed. In the resin molded component 1, the second resin member 40 to be described later is secondarily molded in this state.

For example, the second resin member 40 to be described next is formed by assembling the conductive member 30 to the bus bar 10 in which the first resin member 20 is primarily molded, setting (inserting) these into a mold for insert molding in a state in which the bend terminal portion 14 is bent, charging a resin material into the mold, solidifying the resin material, and then demolding. At this time, the insertion hole 33 formed in the conductive member 30 functions as a mold insertion hole into which slide molds M1 and M2 (refer to FIG. 9 to be described later) for molding a portion (resin crank portion 46 to be described later, etc.) covering the bus bar crank portion 12, and the bus bar bend end portions 15 and 16 in the second resin member 40 is to be inserted. Then, after secondary molding of the second resin member 40, the insertion hole 33 functions as a potting filled hole to be filled with the potting material 50.

As illustrated in FIGS. 1, 2, 3, 4, and 6, similarly to the first resin member 20, the second resin member 40 is an insulator that covers a part of the pair of bus bars 10, and insulates the part of the bus bars 10 and the conductive member 30. The second resin member 40 is formed of a resin material having insulation. In this example, the second resin member 40 is a secondary molded body molded in such a manner as to cover the stepped portion 11a of the first axis line direction extending portion 11, the bus bar crank portion 12, the second axis line direction extending portion 13, and the like that are included the bus bar 10, after the first resin member 20 is primarily molded.

More specifically, the second resin member 40 includes a shaft portion 41, a base portion 42, and a columnar portion 43. In the second resin member 40, the shaft portion 41, the base portion 42, and the columnar portion 43 are integrally formed of a resin material having insulation. In the second resin member 40, the shaft portion 41, the base portion 42, and the columnar portion 43 are positioned side by side in this order in the axis line direction D1 from the aerial space S2 side toward the liquid/oil space S1 side.

The shaft portion 41 and the base portion 42 both have central axis lines extending along the axis line direction D1, and are formed into an approximately cylindrical shape coaxial with the first resin member 20 and the conductive member 30. The shaft portion 41 is a portion formed to have a relatively small diameter in the conductive member 30, and the base portion 42 is a portion formed to have a relatively large diameter in the second resin member 40. In this example, an uneven shape is formed in a part of an outer circumferential surface of the base portion 42.

The shaft portion 41 is positioned in the first resin member 20 with being sandwiched between the first axis line direction extending portions 11 of the pair of bus bars 10, and the shaft portion 31 of the conductive member 30 penetrates through the inside of the shaft portion 41 along the axis line direction D1. An end portion of the shaft portion 41 on one side in the axis line direction D1 is coupled to the base portion 42, and the other end portion is approximately aligned with the end portion of the first resin member 20.

The entire base portion 42 is exposed from a portion between the first resin member 20 and the base portion 32 of the conductive member 30. The base portion 42 supports the end portion of the shaft portion 41 on one side in the axis line direction D1, and the stepped portion 11a of the first axis line direction extending portion 11 is buried inside, and the base portion 42 convers and insulates the portion. Then, a through-hole 44 penetrating through the base portion 42 along the axis line direction D1 is formed in the base portion 42.

The through-hole 44 is formed at an outer rim end portion of the base portion 42 into an approximately arc slit shape. The through-hole 44 is formed at a position avoiding the bus bar 10 buried inside the base portion 42, and being continuous to the insertion hole 33 of the conductive member 30 along the axis line direction D1. A pair of through-holes 44 are provided in such a manner as to correspond to the pair of insertion holes 33. The pair of through-holes 44 are arranged in such a manner that one is arranged at a position rotated by about 180 degrees around the axis line direction D1 with respect to the other, and are arranged in such a manner as to symmetrically face with respect to a direction intersecting with the axis line direction D1. The through-hole 44 is a mold removing hole for removing the slide mold M1 by sliding the slide mold M1 along the axis line direction D1, out of the slide molds M1 and M2 (refer to FIG. 9 to be described later) for molding the resin crank portion 46 to be described later or the like, in the second resin member 40. Then, after secondary molding of the second resin member 40, the through-hole 44 functions as a potting filled hole to be filled with the potting material 50.

The columnar portion 43 extends along the axis line direction D1 in accordance with the shape of the bus bar 10. An end portion of the columnar portion 43 on the other side in the axis line direction D1 is coupled to the base portion 42, and supported by the base portion 42. A portion in the first axis line direction extending portion 11 that is positioned closer to the bus bar crank portion 12 side than the stepped portion 11a, the bus bar crank portion 12, and the second axis line direction extending portion 13 are buried inside the columnar portion 43, and the columnar portion 43 covers and insulates the portion. A pair of columnar portions 43 are provided in such a manner as to correspond to the pair of bus bars 10. The pair of columnar portions 43 are arranged in such a manner that one is arranged at a position rotated by about 180 degrees around the axis line direction D1 with respect to the other, and are arranged in such a manner as to symmetrically face with respect to a direction intersecting with the axis line direction D1.

In this example, the columnar portion 43 includes a first axis line direction extending portion 45, the resin crank portion 46, and a second axis line direction extending portion 47. In the columnar portion 43, the first axis line direction extending portion 45, the resin crank portion 46, and the second axis line direction extending portion 47 are positioned side by side in this order in the axis line direction D1 from the aerial space S2 side toward the liquid/oil space S1 side. The first axis line direction extending portion 45 is a portion that covers and insulates a portion of the first axis line direction extending portion 11 that is positioned closer to the bus bar crank portion 12 side than the stepped portion 11a. The resin crank portion 46 is a portion that covers and insulates the bus bar crank portion 12. The second axis line direction extending portion 47 is a portion that covers and insulates the second axis line direction extending portion 13.

Specifically, the first axis line direction extending portion 45 and the second axis line direction extending portion 47 respectively correspond to the shapes of the first axis line direction extending portion 11 and the second axis line direction extending portion 13, and both are portions extending along the axis line direction D1 in the columnar portion 43. In the second axis line direction extending portion 47, an end portion on one side in the axis line direction D1 bends, and the bend terminal portion 14 is exposed, and an end portion on the other side is coupled to the resin crank portion 46. In both of the pair of bus bars 10, the bend terminal portions 14 are exposed from the second resin member 40.

The resin crank portion 46 corresponds to the shape of the bus bar crank portion 12, and is a portion extending along the crank direction D3 in the columnar portion 43. The resin crank portion 46 is interposed between the first axis line direction extending portion 45 and the second axis line direction extending portion 47 with respect to the crank direction D3. Then, an end portion of the resin crank portion 46 on one side in the crank direction D3 is coupled to an end portion of the first axis line direction extending portion 45 on one side in the axis line direction D1, and an end portion on the other side is coupled to an end portion of the second axis line direction extending portion 47 on the other side in the axis line direction D1. In other words, the resin crank portion 46 couples, along the crank direction D3, the end portion of the first axis line direction extending portion 45 on one side in the axis line direction D1, and the end portion of the second axis line direction extending portion 47 on the other side in the axis line direction D1.

In the columnar portion 43, a portion at which the end portion of the first axis line direction extending portion 45 and the resin crank portion 46 intersect approximately orthogonally forms a resin bend end portion 48, and a portion at which the end portion of the second axis line direction extending portion 47 and the resin crank portion 46 intersect approximately orthogonally forms a resin bend end portion 49. The columnar portion 43 includes the resin bend end portion 48 and the resin bend end portion 49. The resin bend end portion 48 and the resin bend end portion 49 respectively cover and insulate the bus bar bend end portion 15 and the bus bar bend end portion 16. By the two resin bend end portions corresponding to the resin bend end portion 48 and the resin bend end portion 49, and the resin crank portion 46, the columnar portion 43 is formed into a crank shape of bending approximately orthogonally at two points.

Then, the resin crank portion 46, and the two resin bend end portions corresponding to the resin bend end portion 48 and the resin bend end portion 49 form a portion in the columnar portion 43 that is positioned inside the insertion hole 33 of the conductive member 30, as illustrated in FIGS. 6, 7, 8, and 9. Then, in a state of being accommodated inside the insertion hole 33, the resin crank portion 46 includes a clearance gap G between itself and an inner wall surface 33a of the insertion hole 33 over the whole circumference around the crank direction D3 (in particular, refer to FIGS. 7 and 8). That is to say, in a state in which the potting material 50 is not charged into the insertion hole 33 yet, the whole circumference around the crank direction D3 of the resin crank portion 46 is exposed like a beam inside the insertion hole 33.

As described above, the second resin member 40 having the above-described configuration is formed by assembling the conductive member 30 with respect to the bus bar 10 in which the first resin member 20 is primarily molded, setting (inserting) these into a mold for insert molding in a state in which the bend terminal portion 14 is bent, charging a resin material into the mold, solidifying the resin material, and then demolding. In the second resin member 40 in which each portion is molded by insert molding in this manner, the resin crank portion 46 is interposed between the first axis line direction extending portion 45 and the second axis line direction extending portion 47. With this configuration, as illustrated in FIG. 8, when the second resin member 40 is viewed in the axis line direction D1, a molded position of the resin crank portion 46 and a position of the bend terminal portion 14 of the bus bar 10 are positioned with being shifted along a direction around the axis line direction D1. Here, it can also be said that the molded position of the resin crank portion 46 corresponds to the position of the insertion hole 33 at which the resin crank portion 46 is provided.

Then, by the molded position of the resin crank portion 46 (the position of the insertion hole 33) and the position of the bend terminal portion 14 being positioned with being shifted, as illustrated in FIG. 9, the resin molded component 1 becomes able to use the slide mold M2 as a mold for molding the resin crank portion 46 or the like in the insertion hole 33. That is, by the above-described shift being provided in the resin molded component 1, out of the slide molds M1 and M2 for molding the resin crank portion 46, and the resin bend end portions 48 and 49 in the insertion hole 33, it becomes possible to remove the slide mold M2 to be inserted from the insertion hole 33 side, by sliding the slide mold M2 along the axis line direction D1 while avoiding the bend terminal portion 14.

Then, as illustrated in FIGS. 1, 2, 4, 10, 11, and 12, the potting material 50 is a filler to be charged into the insertion hole 33 from which the slide molds M1 and M2 are removed by being slid along the axis line direction D1 after the secondary molding of the second resin member 40 as described above. The potting material 50 is formed of a resin material having insulation and having high adhesiveness and trackability. By being densely charged into the insertion hole 33 without a clearance gap, and becoming hardened, the potting material 50 adheres tightly to the inner wall surface 33a of the insertion hole 33 and the second resin member 40, and seals the insertion hole 33. The potting material 50 thereby stops water into the insertion hole 33, and exhibits waterproof/oilproof performance.

Figure 12:
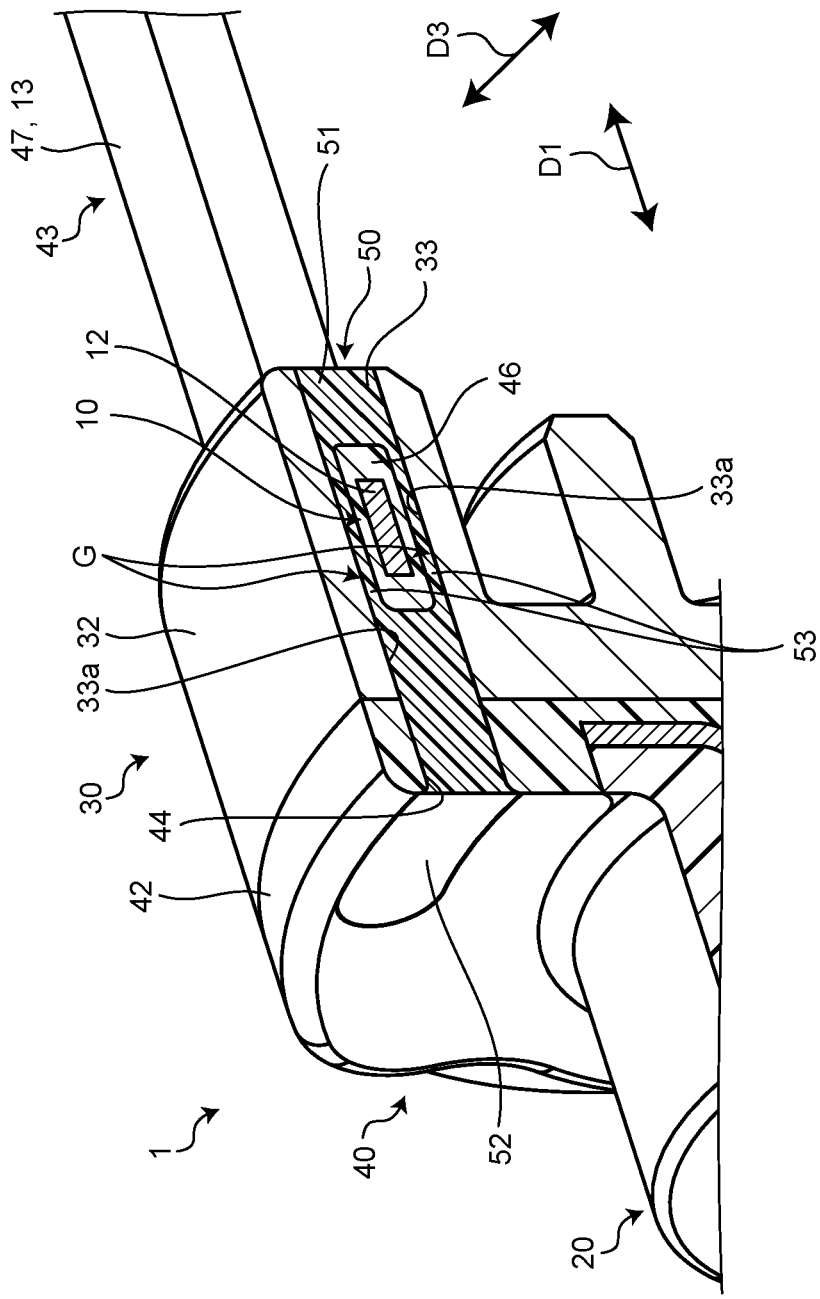
FIG. 12 is a schematic partial cross-sectional perspective view illustrating a schematic configuration of a resin molded component according to an embodiment.

Specifically, in a state of being charged into the insertion hole 33, the potting material 50 covers the whole circumference of the resin crank portion 46 (in particular, refer to FIG. 12, etc.). That is, the potting material 50 is charged into the clearance gap G formed between the resin crank portion 46 and the inner wall surface 33a of the insertion hole 33 over the whole circumference around the crank direction D3, and covers the whole circumference of the resin crank portion 46 Further, in a state of being charged into the insertion hole 33, the potting material 50 is interposed between the outside of the insertion hole 33 and the resin bend end portions 48 and 49, and prevents water and oil from entering the insertion hole 33. In this example, the potting material 50 is also charged into the through-hole 44 formed in the second resin member 40.

That is to say, in brief, the potting material 50 of the present embodiment includes, as broad classification, a lid portion 51 blocking an opening of the insertion hole 33 on one side in the axis line direction D1, a lid portion 52 blocking an opening of the through-hole 44 on the other side in the axis line direction D1, and a cover portion 53 that is charged into the clearance gap G between the resin crank portion 46 and the inner wall surface 33a of the insertion hole 33 and covers the whole circumference of the resin crank portion 46 (in particular, refer to FIGS. 10, 11, 12, and the like).

With this configuration, in the resin molded component 1, a closely-attached surface of the inner wall surface 33a of the insertion hole 33 of the conductive member 30 or the like, and the potting material 50, and a closely-attached surface of the resin crank portion 46, the resin bend end portion 48, the resin bend end portion 49, and the like of the second resin member 40, and the potting material 50, a waterproof/oilproof line L (in particular, refer to FIGS. 10, 11, and the like) is formed. As a result, by the waterproof/oilproof line L, the resin molded component 1 can prevent water and oil from entering the insertion hole 33 and ensure waterproof/oilproof performance.

The resin molded component 1 described above can connect, via the bus bar 10 forming an electrically-conducting path, a connection target on one side in the axis line direction D1, and a connection target on the other side. In this case, by covering the bus bar 10 with the first resin member 20 and the second resin member 40, the resin molded component 1 insulates the bus bar 10 and the conductive member 30. With such a configuration, the resin molded component 1 is sometimes applied under an environment under which a space on one side of the boundary B corresponding to an end surface of the conductive member 30 becomes the liquid/oil space S1, and a space on the other side becomes the aerial space S2. In this case, by the potting material 50 charged into the insertion hole 33 into which the bus bar 10 is inserted in the conductive member 30, the resin molded component 1 can prevent water and oil from entering the insertion hole 33 from the liquid/oil space S1 side, and ensure waterproof/oilproof performance. At this time, by the potting material 50 is applied in such a manner as to cover the whole circumference of the resin crank portion 46, in a state of being charged into the insertion hole 33, the resin molded component 1 can surely perform waterproofing or oilproofing on the closely-attached surface of the resin crank portion 46 and the potting material 50. With this configuration, the resin molded component 1 can prevent water and oil from making entry into the aerial space S2 side from the liquid/oil space S1 side via a small clearance gap that can be generated on a boundary surface between the conductive member 30 and the second resin member 40 that are formed of different materials, for example.

Then, in the structure of the resin molded component 1 for ensuring waterproof/oilproof performance by charging the potting material 50 into the insertion hole 33 as described above, in the bus bar 10 and the second resin member 40, the bus bar crank portion 12 and the resin crank portion 46 are interposed. With this configuration, when the resin molded component 1 is viewed in the axis line direction D1, the position of the insertion hole 33 being the molded position of the resin crank portion 46 and the position of the bend terminal portion 14 of the bus bar 10 can be positioned with being shifted along a direction around the axis line direction D1. With this configuration, out of the slide molds M1 and M2 for molding the resin crank portion 46, and the resin bend end portions 48 and 49 in the insertion hole 33, the resin molded component 1 can remove the slide mold M2 to be inserted from the insertion hole 33 side, by sliding the slide mold M2 along the axis line direction D1 while avoiding the bend terminal portion 14. That is, the resin molded component 1 can mold the resin crank portion 46 and the like using the slide mold M2 as a mold for molding the resin crank portion 46 and the like in the insertion hole 33, and can accordingly improve mass productivity.

As described above, the resin molded component 1 of the present embodiment can achieve both of two structures corresponding to a structure that ensures the moldability of a mold in insert molding, and a structure that satisfies waterproof performance using the potting material 50. That is, the resin molded component 1 can properly ensure waterproof/oilproof performance while ensuring the moldability of a mold in insert molding and improving mass productivity.

In this example, in the above-described resin molded component 1, the clearance gap G is formed between the resin crank portion 46 and the inner wall surface 33a of the insertion hole 33 over the whole circumference around the crank direction D3, and the whole circumference of the resin crank portion 46 is covered by the potting material 50 being charged into the clearance gap G. With this configuration, the resin molded component 1 can surely perform waterproofing and oilproofing on the closely-attached surface of the resin crank portion 46 and the potting material 50 as described above, and properly ensure waterproof/oilproof performance as described above.

Further, here, in the resin molded component 1 described above, in a state of being charged into the insertion hole 33, the potting material 50 is interposed between the outside of the insertion hole 33 and the resin bend end portions 48 and 39, and can prevent water and oil from entering the insertion hole 33. With this configuration, by the waterproof/oilproof line L formed on the closely-attached surface of the inner wall surface 33a of the insertion hole 33, the resin crank portion 46, the resin bend end portion 48, the resin bend end portion 49, and the like, and the potting material 50, the resin molded component 1 can prevent water and oil from entering the insertion hole 33, and ensure waterproof/oilproof performance. Consequently, the resin molded component 1 can properly ensure waterproof/oilproof performance as described above.

In addition, the above-described resin molded component according to an embodiment of the present invention is not limited to the above-described embodiment, and various changes can be made within the scope set forth in the appended claims.

In the above description, it has been described that a pair of bus bars 10 having approximately the same shape are provided, but the bus bars 10 are not limited to this. The number of bus bars 10 may be one or three or more. Further, all the bus bars 10 need not have approximately the same shape.

In the above description, it has been described that the resin molded component 1 includes the first resin member 20, but the configuration is not limited to this. The resin molded component 1 needs not include the first resin member 20, or the first resin member 20 and the second resin member 40 may be integrally formed.

The resin molded component according to the present embodiment may be formed by appropriately combining the components of the above-described embodiment and a modified example.

The resin molded component according to the present embodiment brings about such an effect that waterproof/oilproof performance can be properly ensured.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A resin molded component comprising:
    a bus bar having conductivity;
    a conductive member having conductivity and including an insertion hole into which the bus bar is inserted along an axis line direction;
    a resin member covering the bus bar and insulating the bus bar and the conductive member; and
    a potting material charged into the insertion hole, wherein
    the bus bar includes a bend terminal portion positioned at an end portion in the axis line direction and bent along a terminal bend direction intersecting with the axis line direction, and a bus bar crank portion positioned inside the insertion hole and extending along a crank direction intersecting with the axis line direction and the terminal bend direction,
    the resin member includes a resin crank portion positioned inside the insertion hole and covering and insulating the bus bar crank portion,
    the potting material covers a whole circumference of the resin crank portion in a state of being charged into the insertion hole, and wherein
    the resin crank portion includes a clearance gap between the resin crank portion and an inner wall surface of the insertion hole over a whole circumference around the crank direction, and
    the potting material is charged into the clearance gap, and covers a whole circumference of the resin crank portion.

2. The resin molded component according to claim 1, wherein
    the bus bar includes a bus bar bend end portion at which an end portion of an axis line direction extending portion positioned inside the insertion hole and extending along the axis line direction, and an end portion of the bus bar crank portion intersect,
    the resin member includes a resin bend end positioned inside the insertion hole and covering and insulating the bus bar bend end portion, and
    the potting material is interposed between an outside of the insertion hole and the resin bend end portion in a state of being charged into the insertion hole.

* * * * *